United States Patent [19]

Gordon et al.

[11] Patent Number: 5,419,565
[45] Date of Patent: May 30, 1995

[54] ELECTRICAL DEVICE FOR DETECTING THE LOCATION AND SPEED OR FORCE OF IMPACT WITH A TARGET

[76] Inventors: Theodore J. Gordon, 23 Sailfish Rd., Vero Beach, Fla. 32960; Thomas A. Gordon, 164 Great Pond Rd., South Glastonbury, Conn. 06073

[21] Appl. No.: 109,736

[22] Filed: Aug. 20, 1993

[51] Int. Cl.⁶ .................. A63B 63/00; F41J 5/056
[52] U.S. Cl. ...................... 273/374; 273/26 A; 273/181 R; 273/181 E; 273/371
[58] Field of Search ........... 273/181 R, 181 A, 181 B, 273/181 C, 181 D, 181 E, 181 F, 181 G, 181 H, 181 J, 181 K, 183.1, 184 R, 185 R, 185 A, 185 B, 26 A, 371, 372, 374, 377, 239

[56] References Cited

U.S. PATENT DOCUMENTS

| | | | |
|---|---|---|---|
| 2,783,999 | 3/1957 | Simjian | 273/181 E |
| 2,894,751 | 7/1959 | Simjian | 273/185 |
| 2,894,752 | 7/1959 | Simjian | 273/185 |
| 3,157,399 | 11/1964 | Gaudet | 273/26 |
| 3,158,372 | 11/1964 | Ohlund et al. | 273/181 G |
| 3,349,620 | 10/1967 | Speiser | 273/181 G |
| 3,398,958 | 8/1968 | Sanzare | 273/102.2 |
| 3,805,030 | 4/1974 | Wichinsky et al. | 273/372 |
| 4,029,315 | 6/1977 | Bon | 273/55 |
| 4,177,994 | 12/1979 | Lindquist | 273/181 E |
| 4,390,181 | 5/1983 | Parish | 273/26 |
| 4,659,090 | 4/1987 | Kustanovich | 273/376 |
| 4,770,527 | 9/1988 | Park | 356/28 |
| 5,024,441 | 6/1991 | Rousseau | 273/181 E |
| 5,031,909 | 7/1991 | Pecker | 273/73 R |
| 5,046,729 | 9/1991 | Yancey | 273/26 |
| 5,064,194 | 11/1991 | Bixler et al. | 273/26 |
| 5,082,286 | 1/1992 | Ryan et al. | 273/239 |
| 5,129,654 | 7/1992 | Bogner | 273/239 |
| 5,226,660 | 7/1993 | Curchod | 273/181 E |

FOREIGN PATENT DOCUMENTS

3-251272 11/1991 Japan ................. 273/181 R

*Primary Examiner*—Jessica J. Harrison
*Attorney, Agent, or Firm*—Hayes & Reinsmith

[57] ABSTRACT

An electro-mechanical detection system for measuring the point of impact of a missile such as a sports projectile on a target and for measuring the velocity and force of impact. The detection system is contained in a large plastic envelope, on which a target is displayed and in one embodiment, the detector is a wire or plastic grid that is instrumented to measure changes in stress in the individual grid elements that occur when the missile impacts the target. In another form of this invention, the detector is embedded in an elastomeric mat contained within the plastic envelope with electrical conductors within the mat subject to movement in a magnetic field when the mat compresses in response to the impact of a missile on the target. In either form of the invention, suitable electronic circuitry is used to convert the signals generated at impact to a display.

6 Claims, 6 Drawing Sheets

ELECTRICAL DEVICE FOR DETECTING THE LOCATION AND SPEED OR FORCE OF IMPACT WITH A TARGET

FIELD OF THE INVENTION

This invention generally relates to a device for detecting the position of contact of a missile on a surface and the missile speed at impact of that contact. A particular application of the improved apparatus of this invention is to sports targets used for training as well as competitive purposes.

Sports targets of the type described herein may be used in baseball, football, soccer, golf, handball, or similar sports to measure the location of impact and the speed or transient force of impact of a sport missile such as a ball used in baseball, golf or soccer; a puck used in hockey; or a manual or body blow as might be realized in boxing or football. Several approaches to the design of such targets have been described previously but none have resulted in devices that combine low cost, durability, and precision in locating the impact point and determining speed or force of impact.

1. Background of the Invention

The prior art discloses a variety of mechanical means of indicating impact position on a target including horizontally and vertically deployed chains, etc. A polymeric foam mat is provided with a target painted on it. The prior art also utilizes electrical apparatus as part of the target including electrical switches, infrared emitters and detectors, vertical and horizontal light beams with a photo-electric array as well as and a piezoelectric transducers to measure position of impact.

Many of the devices of the prior art are constructed in such a manner as to be too delicate for repeated impact by sport balls.

2. Objects of the Invention

It is a primary object of this invention to provide an improved target particularly suited for sports use which is simple and durable in its construction while providing precise information as to the point of target impact and its velocity.

It is a further object to provide an improved target of the type described that is easily manufactured at low cost for extended use.

It is an additional object to provide target apparatus suitable for individual, team and professional training and use including, if desired, apparatus that is easily converted to use in a variety of sports under a variety of environmental conditions.

Other objects will be in pan obvious and in pan pointed out more in detail hereinafter.

A better understanding of this invention will be obtained from the following detailed description and accompanying drawings of illustrative applications of the invention.

SUMMARY OF THE INVENTION

In its preferred form, the target is displayed on a plastic body or envelope of desired size that surrounds a detector having a grid composed of a multiplicity of electrically conducting or non-conducting wires or plastic lines deployed within the plastic envelope. The elements of the grid lie in a single plane within the plastic envelope and this plane is parallel to the principal surface of the envelope.

One preferred form provides piezo-ceramic or voltage generating or modifying components attached to each of the wires or plastic lines comprising the grid, near the point at which the grid is attached to a suitable frame. Electrically conducting leads convey the voltages generated by these components to other circuitry to provide visual and or audible information.

In an alternative form of this invention, a plastic body or envelope surrounds an elastomeric mat such that three planes lie within the elastomeric mat, all parallel to the principal surface of the mat. The first plane contains magnetic strips which create a magnetic field. The other two planes contain electrical conductors in which voltages are induced upon deflection of the conductors. In this later form, the magnetic field may be generated by electromagnets as well as permanent magnets.

In either the preferred or alternate form, suitable electronic circuitry is used to detect the specific conductor or grid member which produces the voltage at the time of impact, as well as the level of induced voltage. These signals are electronically analyzed to determine the location of impact and speed or force of the missile; these signals can be converted to aural form or stored for later use.

THE DRAWINGS

In the Drawings:

FIG. 4 shows a cut-away schematic illustration of a second embodiment form of the invention with FIG. 4a, FIG. 4b, and FIG. 4c showing schematic wire grid lay-outs;

SPECIFIC DESCRIPTION

Figure 1:
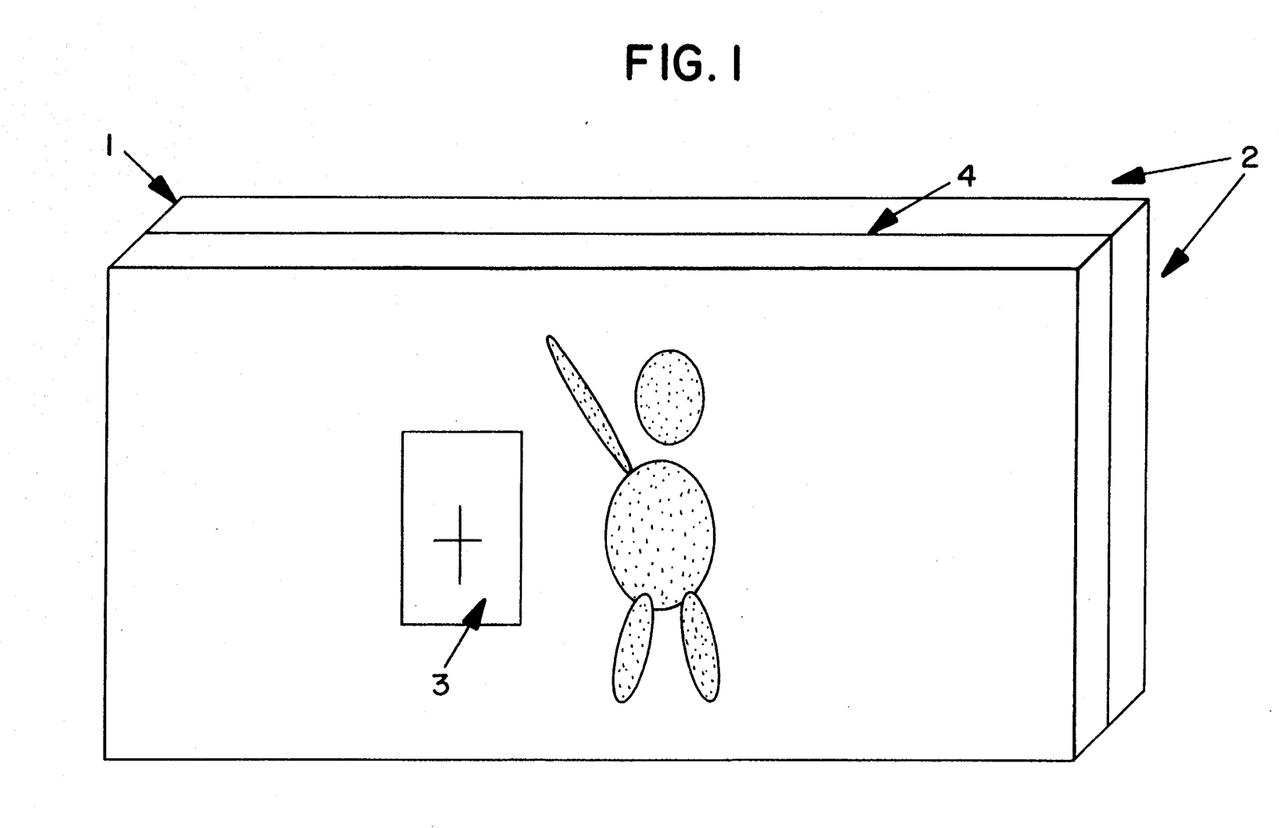
FIG. 1 shows a schematic illustration of a target face as seen by a user.

The general appearance of the target 1 to an athlete is shown in FIG. 1 wherein the plastic envelope 2 forms a removable and replaceable outer cover on which a representation of the target such as a baseball strike zone 3 is placed in any suitable manner. Outer surface 2 is held in place around a suitable inner supporting form 4 by any suitable means such as a zipper or lacing (not shown). Envelope 2 is made of a suitable smooth and tough material that can withstand repeated impacts of the sports device and it must deflect so as to allow the impact energy of the sports projectile to be transmitted to the internal apparatus. Many suitable materials including urethane, polyvinyl chloride and co-polymers of ethylene and propylene may be used. Many suitable means are provided to suspend the apparatus from a suitable frame or wall, as desired.

Figure 2:
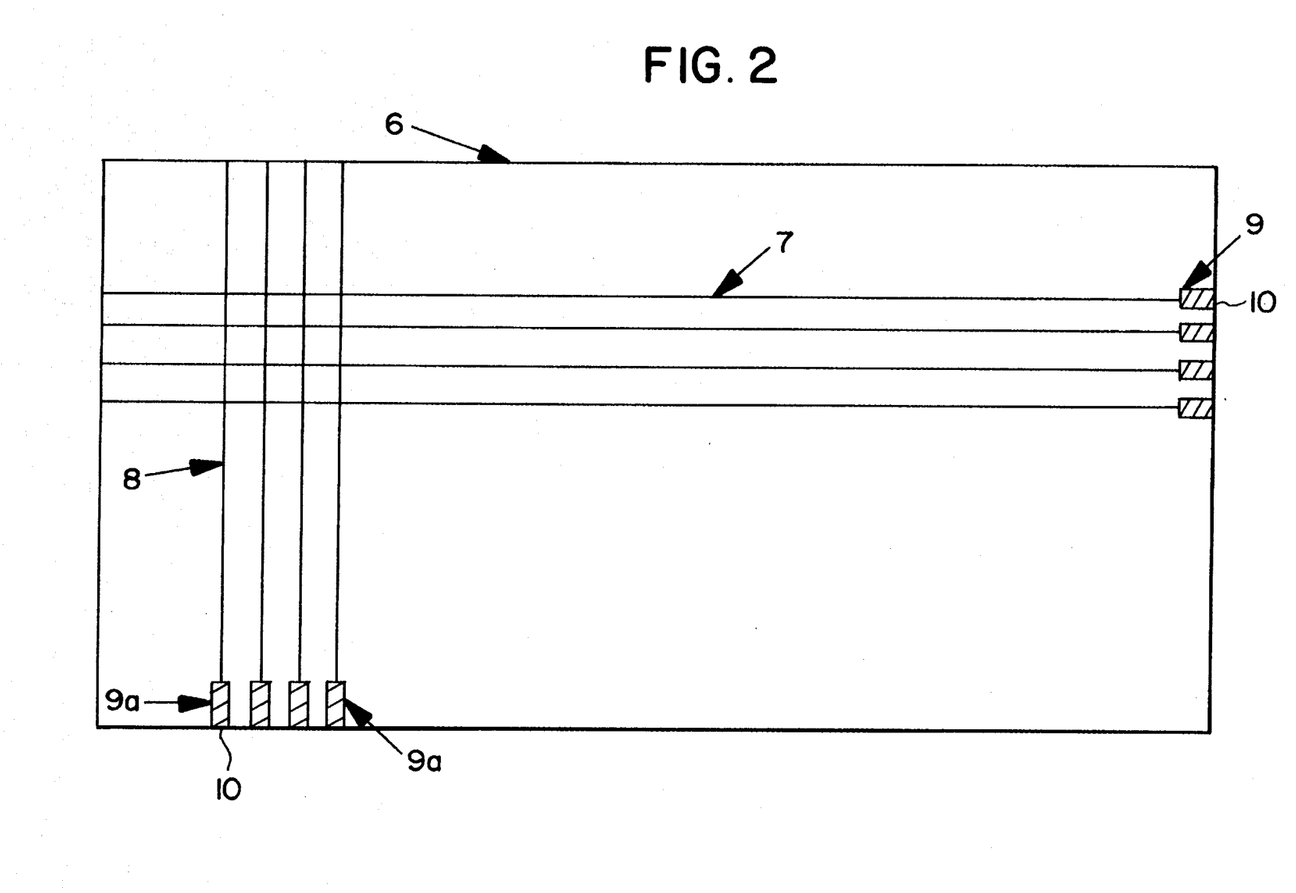
FIG. 2 shows a partial cut-away illustration of FIG. 1.

FIG. 2 depicts a schematic cross section of a preferred form of the invention wherein a supporting form 4 is in the nature of frame 6 and supports plastic envelope 2 of FIG. 1 and the detection apparatus. Wires 8 or plastic lines are deployed on frame 6 in the form of a net or matrix comprised of horizontal wires 7 and vertical wires 8; it is to be understood, however, that the term matrix is intended to include a variety of line orientations including rectilinear. For simplicity only four horizontal and four vertical wires or lines are shown, but the full net is formed by the wires (or lines) extending across the face of the frame 6.

The wires 8 are fastened directly to one side of frame 6 and are connected, in the illustrated embodiment of FIG. 2, to piezo ceramic elements 9 at the other wire end. The voltage generated by stressing of piezo ceramic elements 9 conveyed by means of wires 10 to suitable external circuitry. For clarity, FIG. 2 illustrates each wire 7 connected as at 9a to a single piezo ceramic element 9. The wires 7 or fines that constitute the net should be relatively noncompliant so that an impact on any of them is translated into a change in tension to stress elements 9 with as little loss as practical.

Figure 3:
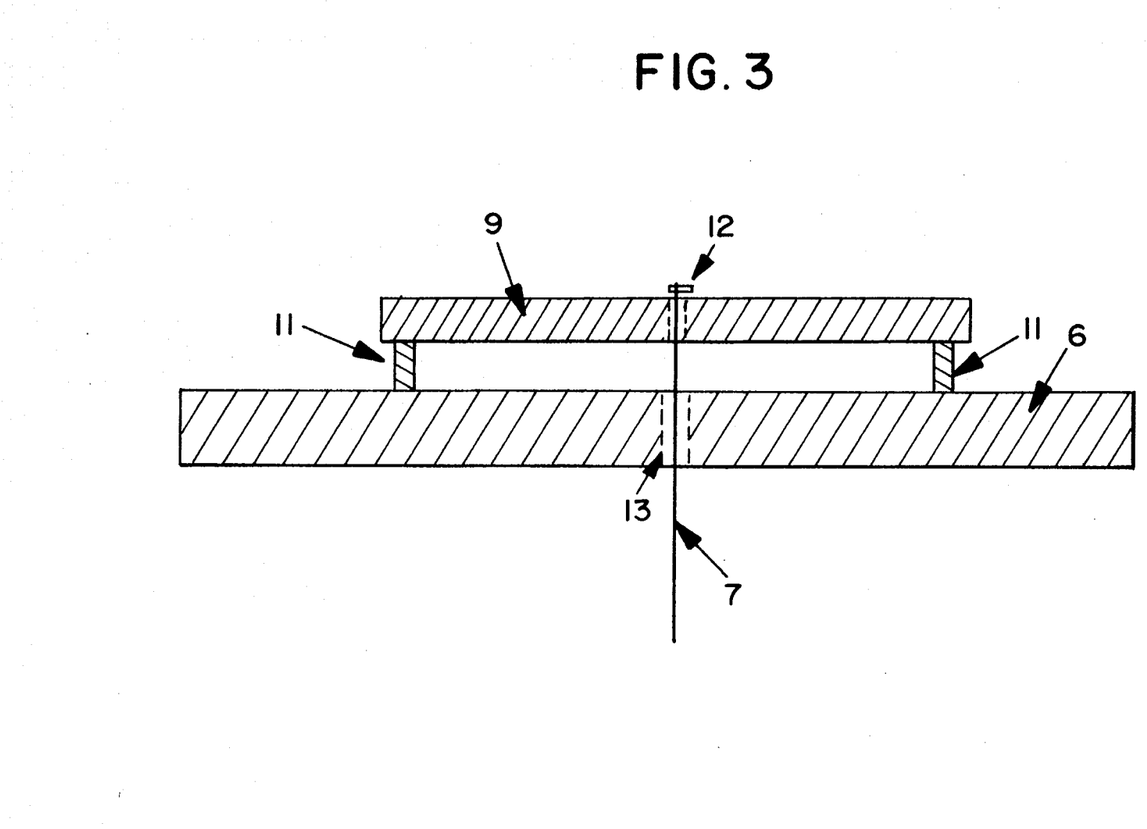
FIG. 3 shows the mounting of the piezo ceramic elements.

FIG. 3 shows a schematic cross-sectional view depicting the mounting of a single piezo ceramic element 9. Frame 6 is penetrated by hole 13 with wire 7 passing through hole 13. Piezo ceramic element 9 is supported a short distance away from frame 6 by supports 11 to permit piezo ceramic element 9 to flex toward frame 6 without interference which causes piezo ceramic element 9 to be stressed when wire 7 is placed in tension. In setting up the preferred system, wire 7 is placed in tension and clamped by fastener 12 to provide a small preload on piezo ceramic element 9. The system is not critical as to the amount of preload since a signal is generated by the piezo ceramic element 9, 9a only when changes in flexure occur; such changes take place when stress increases as a result of projectile impact with the target. Piezo ceramic element 9 is illustrated in the form of a disc but element 9 can have several different geometries.

The amount of electrical signal generated is a function of the dimensions of piezo ceramic element 9, the amount of deflection of element 9, and the frequency of the mechanical impulse applied to element 9. Typically, the lower frequency limit for a reasonably sized piezo ceramic element is 100 cps; thus the pulse applied by the impact must be less 0.01 of a second. For example, a baseball traveling at least 20 mph and on impact it deflects wires 7 by 1 inch in a direction parallel to the flight of the ball and deflection occurs within 0.00284 seconds, well above the low frequency cut off of the threshold of detection and with such size crystal, an open circuit voltage of 10's of volts per mil deflection can be expected; crystals of this sort exhibit a compliance of about 0.0001 inches per gram.

An alternative form of this invention (of FIG. 1) uses a foam mat 20 shown in FIG. 4 with special sensing equipment placed within plastic envelope 1. Mat 20 can be one to four inches thick and, depending on the application, approximately 6 feet by 3 feet in frontal size, filling envelope 1. The requirements that mat 20 must meet include:
a) durability to withstand repeated impacts;
b) resiliency to return to its original state shortly after impact;
c) elasticity such that the deformation of mat 20 under impact must transfer relative motion to the apparatus contained within the mat;
d) low cost;
e) capacity to be cleaned periodically.

Several materials meet these requirements including low to medium density polymeric closed cell foams of vinyl chloride, urethane, butadiene or other such polymers.

Figure 4A:
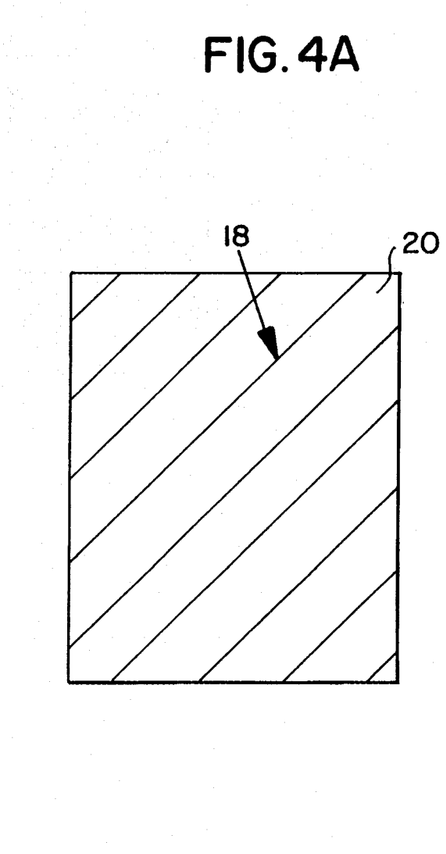
Figure 4B:
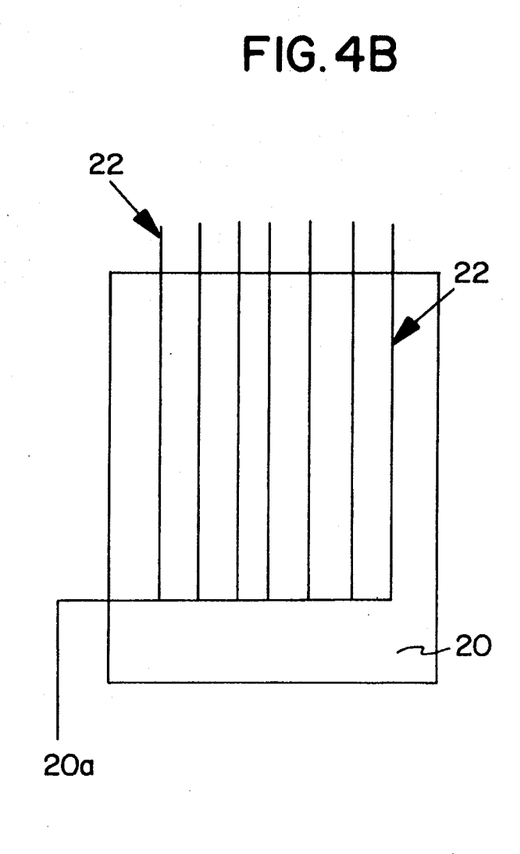
Figure 4C:
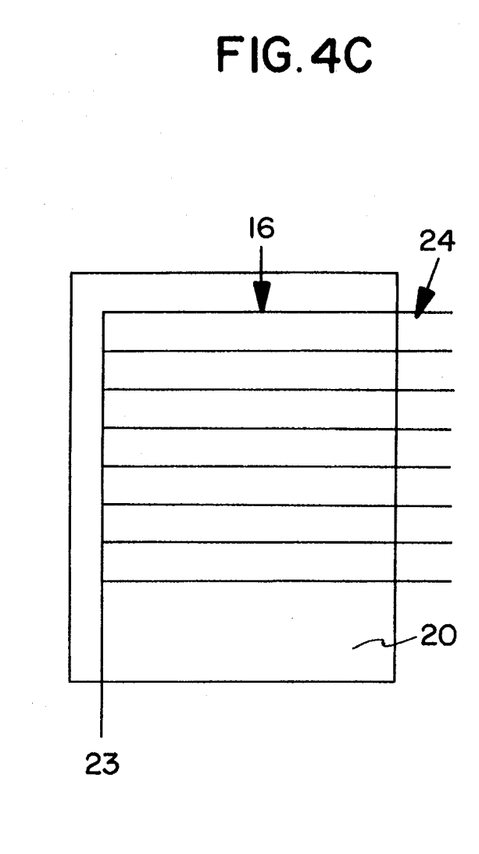

FIGS. 4a, 4b and 4c illustrate alternate approaches within mat 20. Three planes exist within mat 20; the first plane, shown in FIG. 4a contains a series of strip magnets 18 that traverse the mat at an angle of approximately 45 degrees to the vertical. All such strips are arranged with the same magnetic polarity and, ideally would be close enough to one another to create a substantially uniform magnetic field. Magnetic strips 18 can be similar to those used to hold refrigerator doors closed and typically are fabricated of ferrite-based ceramic.

The second plane illustrated by the FIG. 4b is composed of a series of conductors 22 connected together at one end at 20a and extending through the mat 20 to suitable terminals. Similarly the third plane, illustrated in FIG. 4c has wires 16 connected together electrically on line 23 with terminals 24 extending through the edge of the mat. The conductor wires 22 in the second plane and the wires 16 in the third plane are electrically insulated from one another and are physically separated and held in a separated state even when the missile impact occurs because since they are held in relative separation in the foam mat.

The operating principal is such that when the missile impacts the target and the force of impact deflects the foam mat, the wire (grids) 24 and 16 deflect. The deflection of such wires in the field created by magnets 18, causes a small but discernible voltage to be created on the wires 22 and 16, and in turn on the terminals 22 and 24. The amount of the signal depends on the speed of the wire moving through the field, the magnitude of the field, and the field gradient.

In the illustrated embodiment, the three planes are electrically insulated from one another and are preferably separated by no more than about 1/16 of an inch such that the three planes are mounted between a half inch and one inch of the surface of the mat. The criteria used in arriving at these dimensions include:
a) planes containing wires 16 and 22 are mounted as close as possible to magnets 18 so that the conductors are in as intense a magnetic field as possible; and
b) the distance between the surface of mat and the wires 16 and 22 is determined by a balance between the need to mount the wires in these planes as near to the surface as possible to maximize the deflection caused by the impact of the projectile with the target and the need to keep the deflection of the wires within their elastic limits.

The relative geometry of the magnet 18 and wires 14 and 16 are fixed at time of fabrication. The magnets and wire grids can be suspended in their desired locations by frame 6 and the foam mat cast around them. Moreover, other orientation of conductors, conductors and magnets, etc., can be varied.

In this form of the invention, if urethane foam is used as the material for the mat, a higher density "skin" can be formed on the outer surface of the foam during casting and this skin can be used as the outer surface of the target. This approach has the advantage of simplicity and lower cost, but requires that the device be dedicated to a single use.

Figure 5:
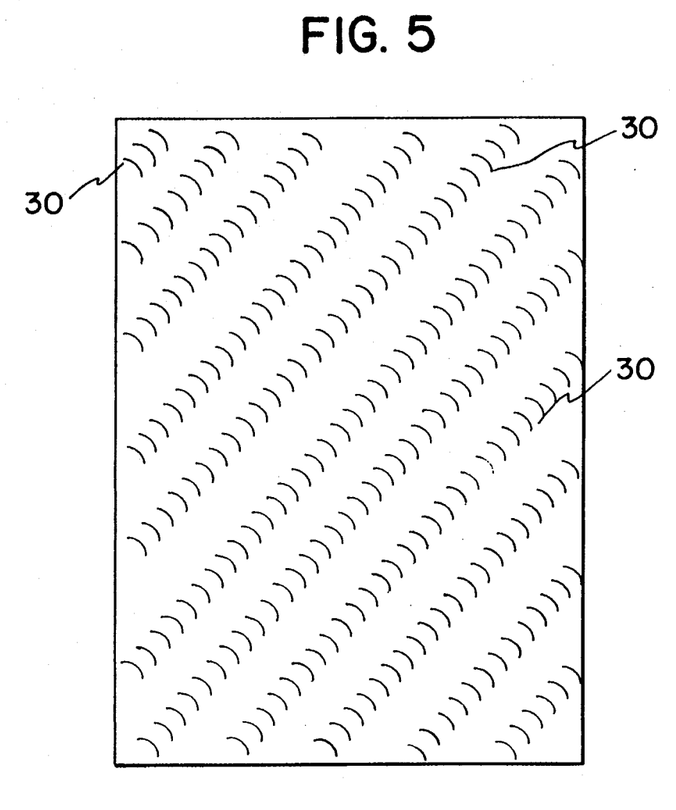
FIG. 5 schematically illustrates the use of electromagnets for creating a magnetic sensing field.

Magnetic strips 18 may be replaced by suitable electromagnets and FIG. 5 schematically shows alternate means of constructing electro magnets with coils of wire, etc., designated 30. In this approach, a series of electromagnets is used with connections between coils made so that the north pole of the magnetic field that each produces is in the same direction. This may be accomplished with the wiring connections shown or by connecting all of the coils parallel, with the current flowing in the same direction in each coil. The coils may be air wound or, to achieve a higher field, wound around a ferromagnetic core.

Figure 6:
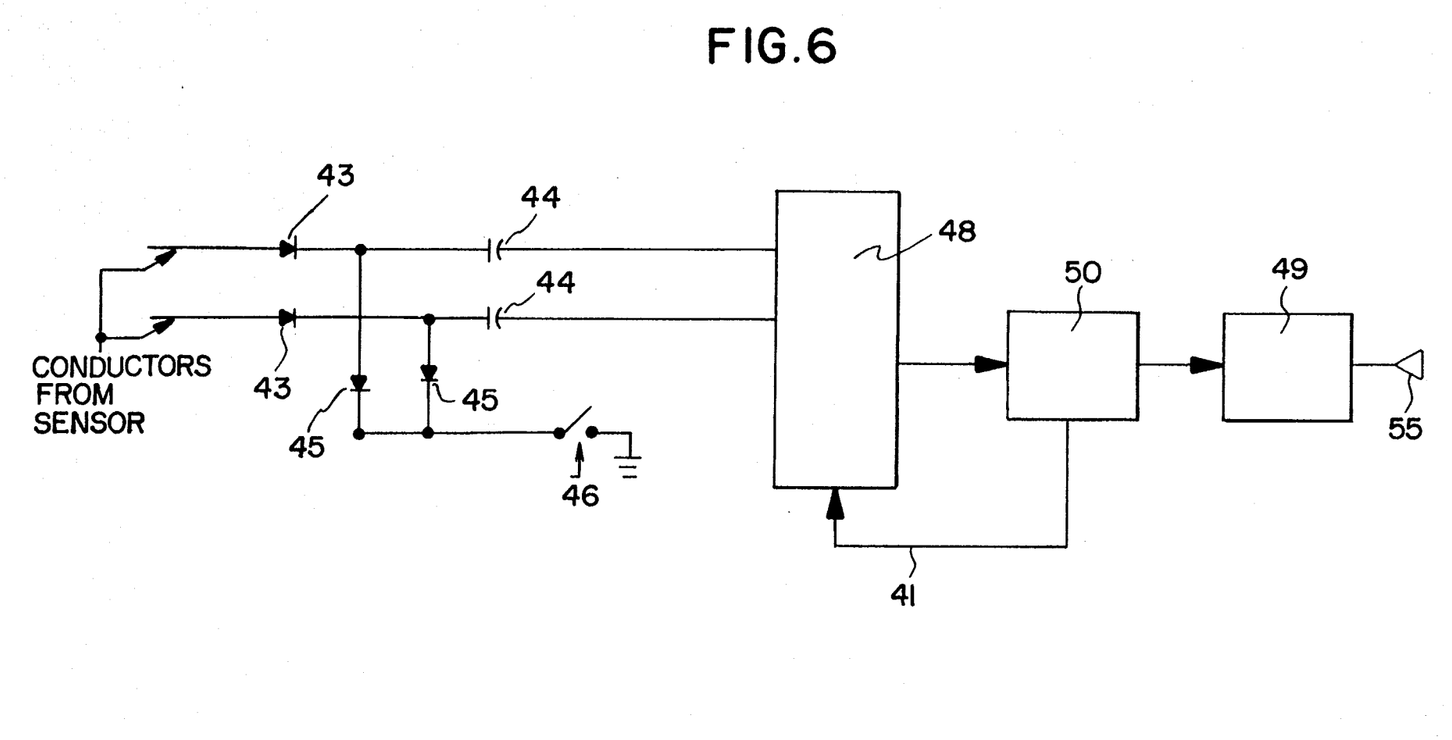
FIG. 6 illustrates a suitable electrical circuit for indicating target results.

For a more complete understanding of the invention, FIG. 6 shows typical circuitry which can be associated with the invention; not illustrated is a power supply that is required if electromagnets are employed.

The conductors from the sensor of this invention are connected electrically through suitable circuitry to sample and hold circuits comprising of diodes 43, capacitors 44, diodes 45 and switch 46. When a signal is generated as a result of an impact on one or more wires 7, 8, 15, or other conductors, capacitors 44 are charged through diodes 43 to the peak voltage stored on the capacitors 44. A suitable analog to digital converter and sampling circuit 48 sequentially reads the voltage on each capacitor and delivers this information in serial form to the computer 50. The computer also generates the strobe signal 41 that controls the sampling rate. It should be understood that the analog voltage on the capacitors may be amplified using a solid state amplifier if required. In the alternate approach, the use of such a circuit provides the possibility of amplifying the signal induced by the motion of the wires through the magnetic field, greatly increasing the sensitivity of the apparatus.

Suppose that our target used 144 horizontal wires and 96 vertical wires. In the approach of this invention, a total of 240 elements (144 plus 96) would have to be sampled. But if the area in which an impact could occur were to be covered by a matrix array of piezo ceramic discs to detect the impact location, then a total of 13,824 (144 times 96) elements would have to be sampled.

Computer 50, commanding the sequential stepping, has information about the amount of voltage existing on any and all wires after an impact. Because the geometric position of each wire is known, computer 50 can determine the location of the impact by observing the orthogonal wire pairs that simultaneously show peak voltage.

Computer 50, also has information about the velocity of impact because the A/D converter 48, provides a digital signal determined by the peak voltage developed during an impact. The speed of motion of the wires through the field can, through initial calibration be interpreted as speed of the projectile at impact or, for some sports such as boxing, the transient force that existed at the instant of impact.

The output of the computer 50 can be directed to a visual display 49, or an audio output system 55, to provide feedback to the user. The visual display can take many forms: an LED, or for example, LCD display of speed and location of impact (e.g., "high and inside"), balls, strikes, outs and walks, etc. and the voice output can simulate an umpire's voice.

While the desired spacing between wires in the detection grid is ½ the size of the sports implement, use of computer analysis of the impact data permits greater spacing to be employed with little loss of accuracy. Greater spacing simplifies the circuitry and reduces costs. If a spacing greater than the diameter of the sports implement were used, the position of impact could be determined by interpolation of the voltages generated on adjacent wires of the grid. For example, if the implement hit midway between two wires, each would have the same voltage. If it hit ¼ of the way between two wires, the closer wire would have the higher voltage and, to a first approximation, 3 times the voltage of the more distant wire. The exact relationship between voltages on adjacent wires and impact positions can be determined by calibration, and this calibration can be included in the computer's software. The velocity of impact can be similarly determined by summing the voltages on adjacent wires. There are many other applications of the techniques disclosed here for detecting the location and force of impact on a target.

There are many other applications of the techniques disclosed here for detecting the location and force of impact on a target. Among such applications are:

Many sports applications, including a "smart tennis racquet" in which the strings of the racquet correspond to wires of FIG. 2, and the piezo ceramic elements 9 are mounted on or internal to the rim of the racquet that forms the frame 6.

A handwriting keyboard which senses the position of a stylus pressing on a pad of the sort described here; positive identification is enhanced by also sensing the changing patterns of pressure on the stylus as a signature is impressed on the pad.

Certain sports applications permit measurement of whether a ball is "fair" or "foul" to measure the terminus of broad jumper.

The presence of a vehicle of a given weight and speed to trigger traffic control speeding detection devices.

A security switch that activates when a force is applied at a given location or series of locations, either sequentially or in parallel, on the surface of a target, which a predetermined force or speed.

Although this invention has been illustrated and described with respect to exemplary embodiments thereof, it should be understood by those skilled in the art that various changes, omissions and additions may be made without departing from the spirit and scope of the invention.

We claim:

1. A detection system for determining the point of impact of a projectile on a target comprising:
   lines generally arranged in rows and columns to form a matrix;
   said lines extending in a predetermined pattern across a target;
   an elastomeric enclosure for said lines for retaining said lines in said predetermined position, said enclosure providing a surface for a target;
   means including each of said lines for producing an electric signal upon impact on said elastomeric enclosure and deflection of each said line upon impact of a projectile and indicating means for reporting the electric signal from each deflected line to permit determination of the impact point of a projectile on a target; and
   wherein the means including each of said lines produces an electric signal whose magnitude varies with the magnitude of deflection of each line thereby to provide matrix coordinates of the impact point and magnitude of the electric signal proportional to the velocity of impact of the mass of the projectile.

2. The detection system of claim 1 wherein a frame for supporting one end of each of said lines is provided, wherein the other end of each of said lines is connected to a piezo electric element fixed in position relative to said frame whereby deflection of at least one of said lines stresses the attached piezo electric element to produce an electric signal.

3. The detection system of claim 2, wherein circuit means analyze which piezo electric element produces an output voltage to permit determination of the projectile impact point on the matrix and also to measure the output voltage magnitude to determine projectile velocity.

4. The detection system of claim 1 wherein:
each line is an electric conductor, means providing a magnetic field associated with each conductor is provided within the enclosure whereby a signal is generated by the wires at the point of impact by relative movement of the wire and magnetic field, the magnitude of the signal being proportional to the projectile velocity of impact.

5. The detection system of claim 4 wherein the magnetic field associated with each conductor is provided by permanent magnets embedded in the elastomeric enclosure.

6. The detection system of claim 1 wherein a frame is provided to support the elastomeric enclosure and to which each of said lines is mechanically connected to fix the peripheral position of the lines.

* * * * *